United States Patent [19]

Yamamoto et al.

[11] Patent Number: 5,065,441
[45] Date of Patent: Nov. 12, 1991

[54] IMAGE PROCESSING APPARATUS

[75] Inventors: Hiroyuki Yamamoto; Toshihiro Motoi; Toshiharu Nishimura; Tadao Kishimoto, all of Hachioji, Japan

[73] Assignee: Konica Corporation, Tokyo, Japan

[21] Appl. No.: 544,663

[22] Filed: Jun. 27, 1990

[30] Foreign Application Priority Data

Jun. 28, 1989 [JP] Japan ................. 1-166450

[51] Int. Cl.$^5$ .......................... G06K 9/00; G01D 9/42
[52] U.S. Cl. ..................................... 382/41; 346/108; 358/296; 358/447
[58] Field of Search ................. 358/445, 447; 346/108, 346/160; 382/41

[56] References Cited

U.S. PATENT DOCUMENTS 4,763,199  8/1988  Suzuki ................................ 358/445
4,811,037  3/1989  Arai ................................... 346/108
4,864,326  9/1989  Kawamura et al. ................. 346/108
4,864,419  9/1989  Saito et al. ......................... 346/160

Primary Examiner—Leo H. Boudreau
Assistant Examiner—Rohini Khanna
Attorney, Agent, or Firm—Frishauf, Holtz, Goodman & Woodward

[57] ABSTRACT

An image processing apparatus for processing an image signal, comprising a clock for generating a periodical clock signal, a pattern signal generator for generating 2N (where N is a positive integer) pattern signals, each of the pattern signals having a constant wave-form, a wave length of 2N times longer than that of the periodical clock signal and a phase difference 360/2N relative to another one of the pattern signals, a comparator for comparing the pattern signals with the image signal and for generating 2N of comparison signals, and a composition generator for combining said 2N comparison signals and for generating a pulse-duration modulated signal from the combined 2N comparison signals.

15 Claims, 12 Drawing Sheets

FIG. 2A (DCK) 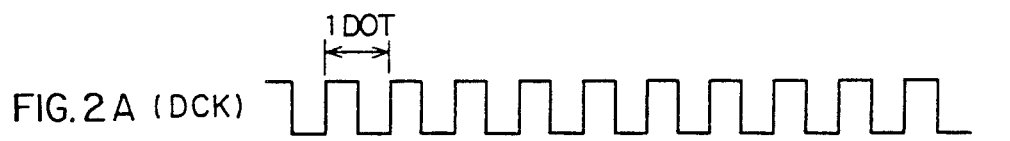
FIG. 2B (Pa) 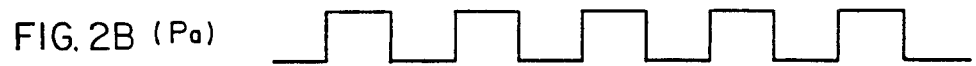
FIG. 2C (Pb) 

FIG. 2E (SPWMa) 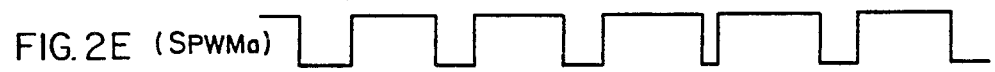
FIG. 2F (SPWMb) 
FIG. 2G (SPWM) 

FIG. 4A (DCK) 
FIG. 4B (Pa) 
FIG. 4C (Pb) 

FIG. 4E (SPWMa) 
FIG. 4F (SPWMb) 
FIG. 4G (SPWM) 
FIG. 4H (SPWM) 

FIG. 8A (DCK)
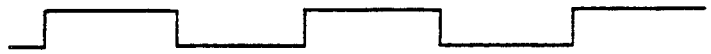
FIG. 8B (Pa)
FIG. 8C (Pb)
FIG. 8D (Pc)
FIG. 8E (Pd)
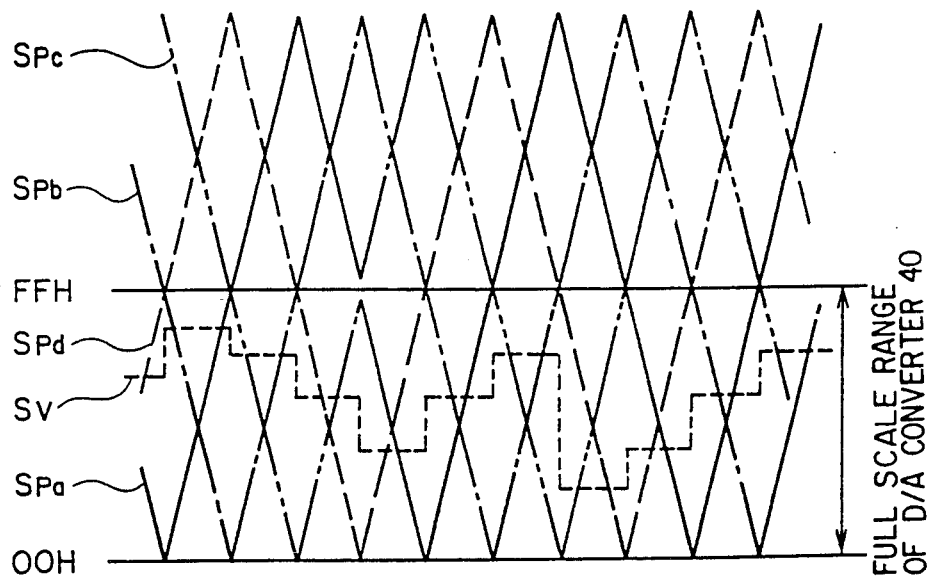
FIG. 8F
FIG. 8G (SPWMa)
FIG. 8H (SPWMb)
FIG. 8I (SPWMc)
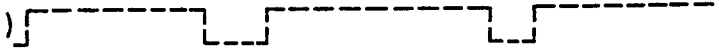
FIG. 8J (SPWMd)
FIG. 8K (SPWM)
FIG. 8L (SPWM)

FIG. 12
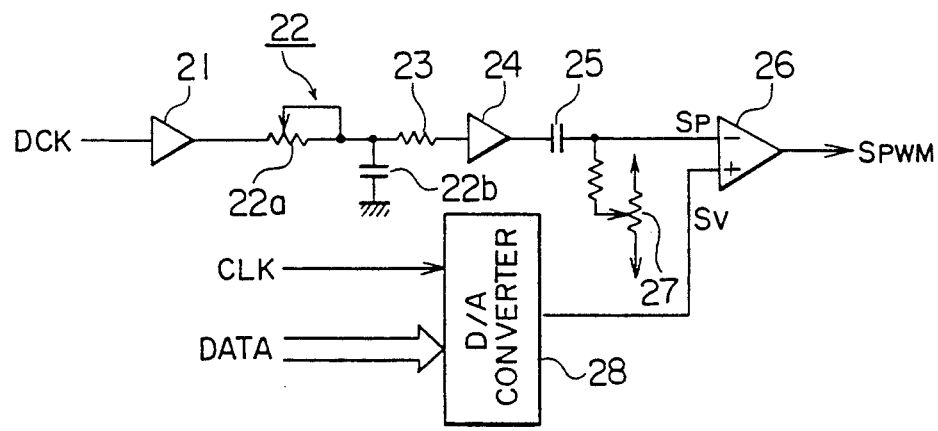
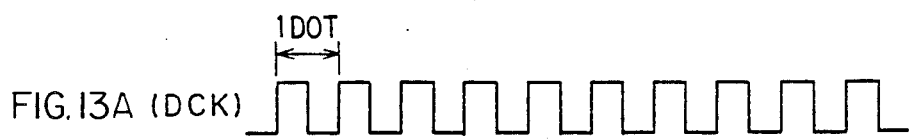
FIG.13A (DCK)
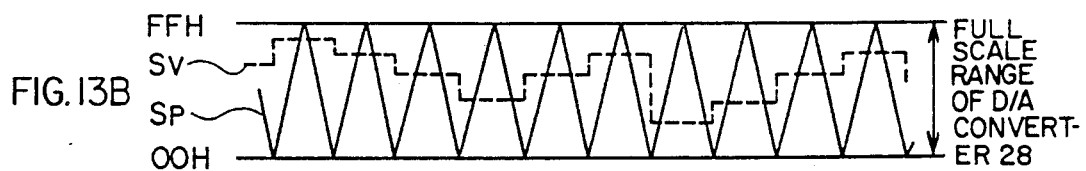
FIG.13B
FIG.13C (SPWM)
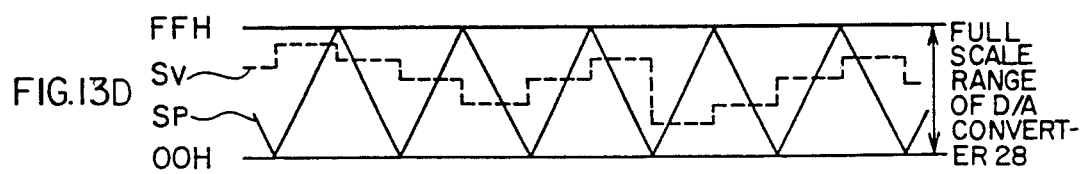
FIG.13D
FIG.13E (SPWM)

IMAGE PROCESSING APPARATUS

BACKGROUND OF THE INVENTION

The present invention relates to an image processing apparatus for use with digital photocopying machines and similar machines utilizing a laser beam.

As for image processing apparatuses, for example, a digital photocopying machine utilizing a laser beam, as shown in FIG. 9, often comprises a scanner section 300, an image processor section 400, and a printer section 100.

The scanner section 300 is run to optically scan on a manuscript 200. Image information of the manuscript then can be converted to an optical image. The optical image is fed to the image processor section 400 to be converted to a video signal, which is subjected to necessary video signal processes.

The video signal processes include an enlargement or a reduction process, a shading process, a window process, and so forth.

For color images, they include an additional color ghost correction process.

The printer section 100 can record the image on the basis of a digital video signal, or a video data, of specific bits formed by the image processor section 400.

FIG. 10 shows an example of the printer section 100. In this example, an electrophotographic printer utilizing a photosensitive drum is used, and a laser beam is used as light source for forming an electrostatic latent image.

In FIG. 10, a video data DATA output of the image processor section 400 is fed to a modulation circuit 110. The modulation circuit 110 can form a pulse-width modulated (PWM) signal SPWM on the basis of the video data DATA.

The modulated signal SPWM formed by the modulation circuit 110 is fed to a semiconductor laser 931 through a laser driver circuit 932. The modulated signal modulates the laser beam internally. The laser driver circuit 932 can be controlled by a control signal led from a timing circuit 933 so that a drive state is allowed only for a horizontal and a vertical effective section.

To the laser driver circuit 932 is fed back a signal indicating an energy amount of the laser beam from the semiconductor laser 931. Driving of the semiconductor laser 931 is controlled so that the amount of energy of the laser beam can be made constant.

The laser beam output of the semiconductor laser 931 is led to a polygonal mirror 935 to be deflected. The laser beam deflected by the polygonal mirror 935 is detected at its scanning start point by an index sensor 936, and is converted to a voltage signal through an I/V amplifier 937 to form an index signal SI. The index signal SI (not shown) is fed to a control means that can control an optical scanning timing and the like of the scanner section 300.

A number 934 indicates a motor driver circuit for turning the polygonal mirror 935. Its turn on-off signal is fed from the timing circuit 933.

FIG. 11 shows an example of an image exposing system, or a laser beam scanner on which the laser beam is focused.

The laser beam coming out of the semiconductor laser 931 impinges the above-mentioned polygonal mirror 935 by way of mirrors 942 and 943. The laser beam is deflected by the polygonal mirror 935, and is irradiated to a surface of the photosensitive drum 130 through a focusing f- F lens 944 to focus to a specific diameter. Elements 945 and 946 are cylindrical lenses for correcting an inclination.

The laser beam is made to scan a surface of the photosensitive drum 130 in a specific direction a by the polygonal mirror 935 to produce exposure for formation of the electrostatic latent image corresponding to the video data.

Though not shown, toner of an opposite charge is attracted to the electrostatic latent image to develop an image. A sheet of recording paper is put over the toner image. A corona charger can give a charge opposite to that of the toner to the recording paper to transfer the toner image to the recording paper. The transferred toner image, further, is fixed onto the recording paper by way of heat or pressure.

FIG. 12 is an example of a modulation circuit provided in the printer section 100. In the figure, a dot clock DCK synchronized with a video data DATA is fed to through a buffer 21 to an integrator 22, comprising a variable resistor 22a and a capacitor 22b. A signal output of the integrator 22 is fed through a serial circuit, comprising a resistor 23, a buffer 24, and direct-current blocking capacitor 25, to a comparator 26 as a pattern signal Sp.

The pattern signal Sp can be adjusted in amplitude thereof by the variable resistor 22a so that the entire pattern signal Sp can be just put in a full scale of OOH to FFH of a digital-to-analog converter 28 which will be described later. It also can be adjusted in an offset value of direct current thereof by a variable resistor 27.

A video data DATA of 8 bits, for example, is fed to the digital-to-analog converter 28, in which it is converted to an analog signal. The analog signal is fed to a comparator 26 as a video signal Sv. A symbol CLK in the figure is a clock for digital-to-analog conversion.

The comparator 26 can compare the pattern signal Sp from the integrator 22 with the video signal Sv from the digital-to-analog converter 28. The comparator 26 outputs a pulse-width modulated signal SPWM on the basis of the video data DATA is fed to a NAND circuit which constitutes the comparator 26.

In the above-mentioned circuit configuration, if the dot clock DCK has a waveform shown in FIG. 13A, a triangle pattern signal Sp indicated by a solid line in FIG. 13B is fed to the comparator 26. If the video signal Sv is a waveform indicated by a broken line as shown in FIG. 13B, therefore, the comparator 26 can output the pulse-width modulated signal SPWM as shown in FIG. 13C.

However, the dot clock DCK needed to form the mentioned pattern signal Sp will have adversely produced a large distortion in its waveform due to standing waves, external noises, and the like during transmission. This causes the modulated signal SPWM not to be exactly formed, resulting in deterioration of a reproduced image.

For example, if the waveform of the dot clock DCK is normal as shown in FIG. 14A, the pattern signal Sp obtained will be correct as shown in FIG. 15A. If a duty cycle of the dot clock DCK changes as shown in FIG. 14B, on the other hand, the pattern signal Sp will change in its amplitude as shown in FIG. 15B because its rise time and fall time are not periodical. Also, if a noise is mixed with the dot clock DCK as shown in FIG. 14C, the pattern signal Sp will have noise mixed therein as shown in FIG. 15C. Further, if the dot clock DCK changes in its amplitude as shown in FIG. 14D, the pattern signal Sp will change in its amplitude as shown in FIG. 15D because its rise and fall inclinations cannot be identical.

In order to overcome the resulting distortion of the pattern signal Sp, it can be considered that the dot clock DCK should be frequency-divided to be free of the duty cycle change and the like. However, in that way, the pulse-width modulation cannot be made in units of dot clock, resulting in deterioration of the resolution of the reproduced image.

It should be noted that a solid line of FIG. 13D indicates the pattern signal Sp formed by frequency-halving the dot clock DCK. The modulated signal SPWM is the one shown in FIG. 13E wherein the pulse-width modulation is made in units of two dot clocks.

In view of the foregoing, it is a general object of the present invention to provide an image processing apparatus that can reproduce a quality image without the above-mentioned defects.

SUMMARY OF THE INVENTION

The present invention comprises a pattern signal generator circuit that can generate 2N pattern signals of an equal phase difference and of a period 2N times longer than that of a dot clock for video data (where N is a positive integer), 2N comparators that can compare a ½N part of the 2N pattern signals with the video data, and a composing unit that can compose signals output from the 2N comparators to obtain a pulse-width modulated signal.

In the configuration mentioned above, the pattern signal generator circuit can generate the pattern signal having the period 2N times longer than that of the dot clock. It, therefore, uses a dot clock DCK that is frequency-divided to ½N. That is, the dot clock DCK is used with a possible duty change and the like eliminated. This is effective in that the pattern signal avoids distortion to form a correct pulse-width modulated signal SPWM.

Also, the pattern signal generator circuit can not only generate the 2N pattern signals of equal phase difference, but also can compare the ½N part of the 2N pattern signal with the video data. The 2N comparators, therefore, can output the pulse-width modulated signal of every (2N−1)th dot. Therefore, the composing unit can obtain the pulse-width modulated signal SPWM in units of dot clock.

BRIEF DESCRIPTION OF THE DRAWINGS

FIG. 8 is a timing chart illustrating the fourth embodiment. FIG. 12 is a schematic representation of an illustrative embodiment of an prior art. FIGS. 13 through 15 are illustrative representation of the prior art.

DETAILED DESCRIPTION OF THE INVENTION

Figure 1:
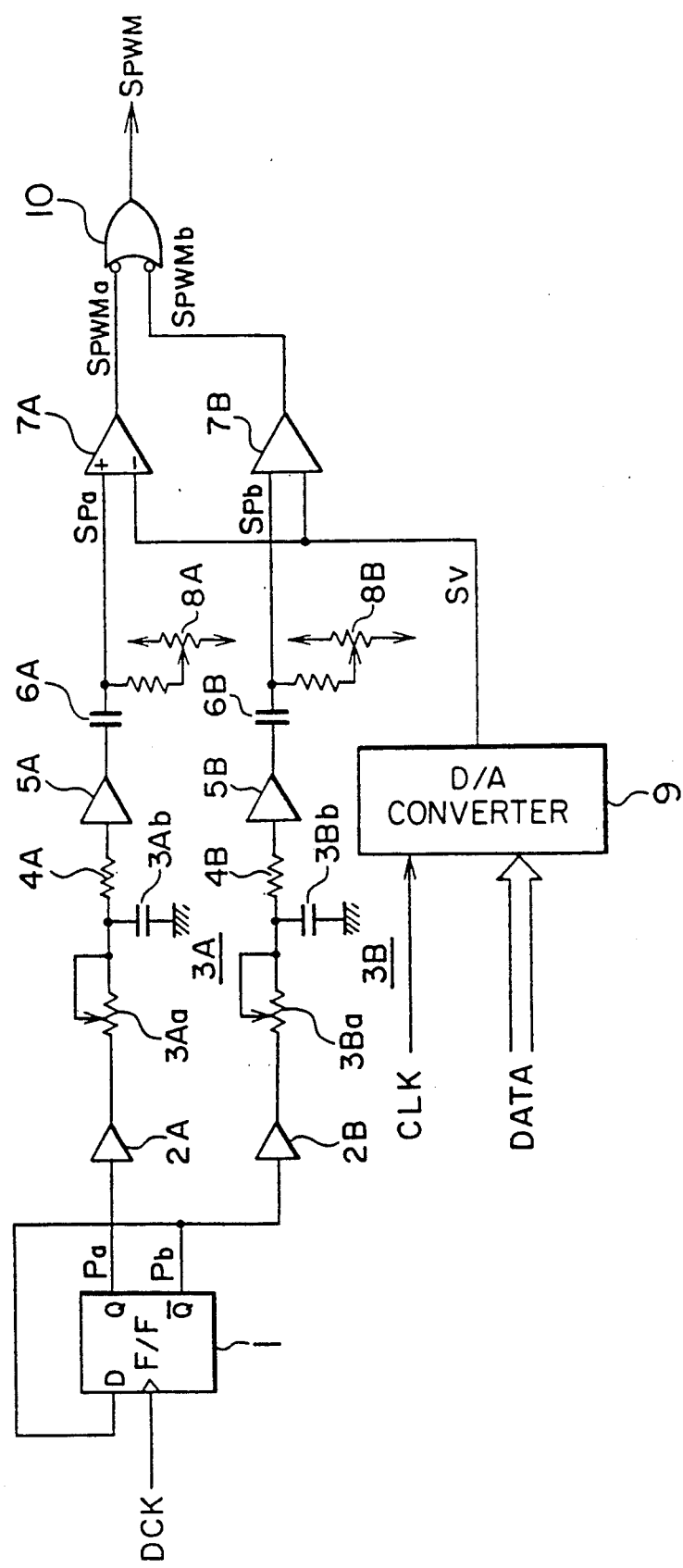
FIG. 1 is a schematic representation of a first illustrative embodiment of the present invention.

With reference to the drawings, is a schematic diagram illustrating an embodiment of the present invention. In the figure, a dot clock DCK synchronized with a video data DATA is fed to a clock input pin of a D flip-flop 1 comprising a frequency divider of ½ frequency division. A signal output of an inverted output pin Q is fed back to a pin D of flip-flop 1.

A pulse signal Pa output of a noninverted output pin Q of the D flip-flop 1 is fed through a buffer 2A to an integrator 3A, comprising a variable resistor 3Aa and a capacitor 3Ab. A signal output of the integrator 3A is fed through a serial circuit, comprising a resistor 4A, a buffer 5A, and direct-current blocking capacitor 6A, to a comparator 7A as a pattern signal Spa.

The pattern signal Spa can be adjusted in amplitude thereof by the variable resistor 3Aa so that a lower half of the pattern signal Spa can be just put in a full scale of 00H to FFH of a digital-to-analog converter 9 which will be described later. It also can be adjusted in an offset value of direct current thereof by a variable resistor 8A.

On the other hand, the pulse Pb signal output of the inverted output pin $\bar{Q}$ of the D flip-flop 1, which is an inversion of the pulse signal Pa, is fed through a buffer 2B to an integrator 3B, comprising a variable resistor 3Ba and a capacitor 3Bb. A signal output of the integrator 3B is fed through a serial circuit, comprising a resistor 4B, a buffer 5B, and direct-current blocking capacitor 6B to a comparator 7B as a pattern signal Spb.

The pattern signal Spb can be adjusted in amplitude thereof by the variable resistor 3Ba so that a lower half of the pattern signal Spb can be just put in a full scale of 00H to FFH of the digital-to-analog converter 9 which will be described later. It also can be adjusted in an offset value of direct current thereof by a variable resistor 8B.

Video data DATA of 8 bits, for example, is fed to the digital-to-analog converter 9, in which it is converted to an analog signal. The analog signal is fed to comparators 7A and 7B as a video signal Sv. A symbol CLK in FIG. 1 designates a clock for digital-to-analog conversion.

The comparator 7A can compare the pattern signal Spa from the integrator 3A with the video signal Sv from the digital-to-analog converter 9. The comparator 7B, on the other hand, can compare the pattern signal Spb from the integrator 3B with the video signal Sv from the digital-to-analog converter 9. The signals output from the comparators 7A and 7B are fed to a NAND circuit 10.

In the above-mentioned circuit configuration, if the dot clock DCK has a waveform shown in FIG. 2A, the D flip-flop 1 can output a waveform shown in FIG. 2B and a waveform shown in FIG. 2C from the noninverted output pin Q and the inverted output pin $\bar{Q}$, respectively, with a phase relationship therebetween as shown. At the same time, the pulse signals Pa and Pb have a period two times that of the dot clock DCK. To the comparators 7A and 7B are fed rectangle pattern signals Spa and Spb by a solid line and a dot-dash-line in FIG. 1D, respectively.

Therefore, if the video signal Sv has a waveform shown in FIG. 1D, the comparator 7A can output a pulse-width modulated signal SPWMa of every other dot shown in FIG. 2E. The comparator 7B can output a pulse-width modulated signal SPWM*b* of every other dot shown in FIG. 2F which is different from the one mentioned above.

Therefore, the NAND circuit 10 can output a pulse-width modulated signal SPWM in units of dot clock on the basis of the video data DATA as shown in FIG. 2G.

In this embodiment, as explained above, the pattern signals Spa and Spb can be generated on the basis of the pulse signals Pa and Pb to which the dot clock DCK is frequency-divided by the D flip-flop 1. In other words, the dot clock DCK is used for elimination of a possible duty cycle change thereof and the like. This means that the pattern signals Spa and Spb will not have any distortion caused therein, and are prevented from a possible adverse change of linearity for modulation from deteriorating an image reproduced.

Also, the comparators 7A and 7B can compare the lower halves of the pattern signals Spa and Spb of inverse phase to each other with the video signal Sv. They can output the pulse-width modulated signals SPWM*a* and SPWM*b* of every other dot, respectively. The NAND circuit 10 can produce the pulse-width modulated signal SPWM in units of dot clock. The reproduced image, therefore, cannot be deteriorated in resolution thereof.

Figure 3:
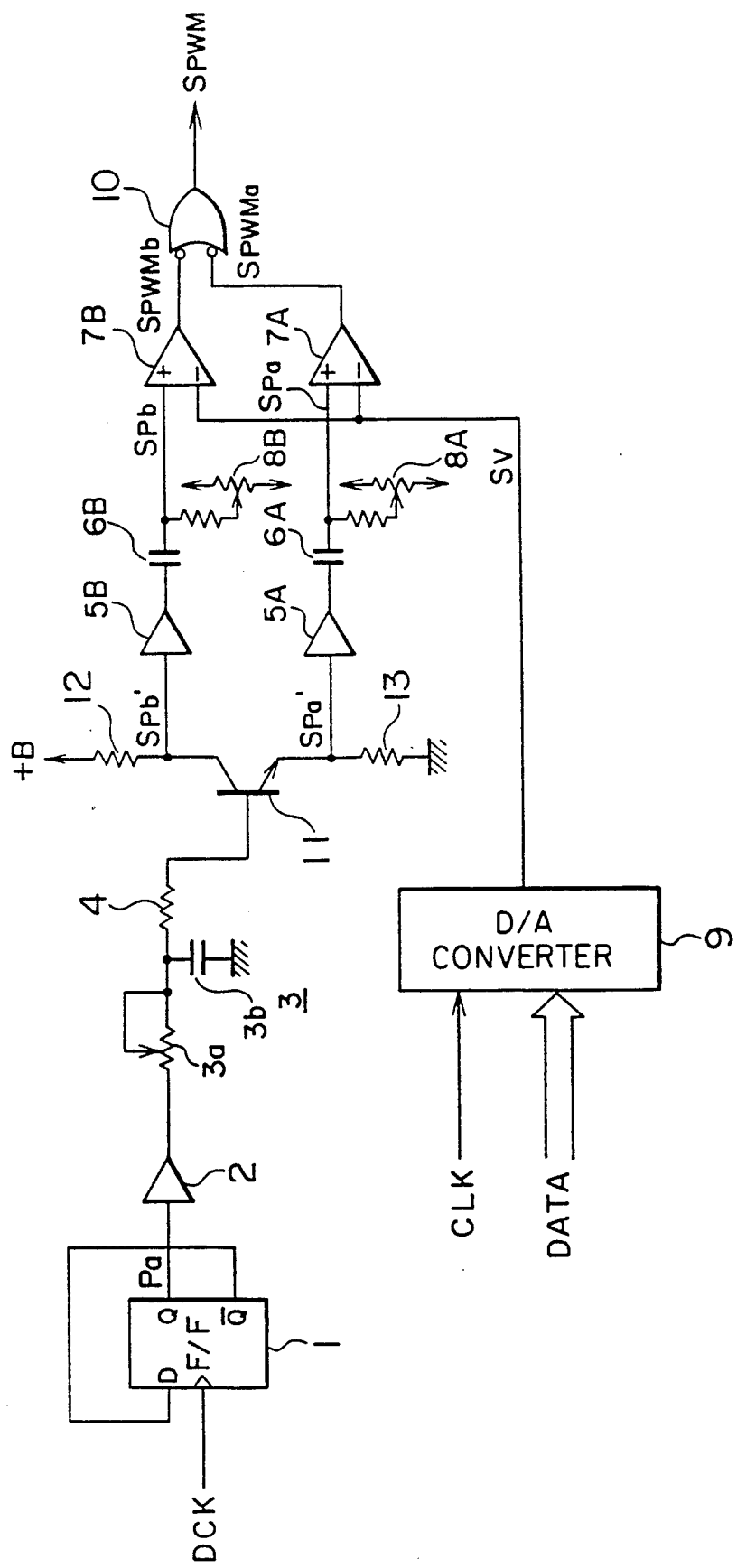
FIG. 3 is a schematic representation of a second illustrative embodiment of the present invention.

FIG. 3 shows a schematic diagram of another embodiment of the present invention. Component parts in FIG. 3 which are the same as those in FIG. 1 have the same reference symbols, and their detailed description is omitted.

In FIG. 3, a pulse signal Pa output of a noninverted output pin Q of a D flip-flop 1 has a period two times longer than that of a dot clock DCK. It is fed through a buffer 2 to an integrator 3, comprising a variable resistor 3*a* and a capacitor 3*b*. A signal output of the integrator 3 is fed through a resistor 4 to a base of a NPN transistor 11. A collector of the transistor 11 is connected through a resistor 12 to a power supply terminal +B. An emitter of the transistor 11 is grounded through a resistor 13.

The transistor 11 can produce at the emitter and collector rectangle pattern signals Spa' and Spb' of inverse phase to each other, respectively, which have a period two times longer than that of the dot clock DCK.

The pattern signal Spa' output of the emitter of the transistor 11 is fed through a serial circuit, comprising a buffer 5A and a direct current blocking capacitor 6A, to a comparator 7A as a pattern signal Spa. The pattern signal Spb' output of the emitter of the transistor 11, on the other hand, is fed through a serial circuit, comprising a buffer 5B and a direct current blocking capacitor 6B, to a comparator 7B as a pattern signal Spb.

The pattern signals Spa and Spb can be adjusted in amplitudes thereof by the variable resistor 3*a* so that lower halves of the pattern signals Spa and Spb can be just put in a full scale of 00H to FFH of a digital-to-analog converter 9. They also can be adjusted in offset values of direct current thereof by variable resistor 8A and 8B.

In this embodiment, also, the pattern signals Spa and Spb can be generated on the basis of the pulse signals Pa and Pb to which the dot clock DCK is frequency-divided by the D flip-flop 1. The comparators 7A and 7B can compare the lower halves of the pattern signals Spa and Spb of inverse phase to each other with the video signal Sv. They can output the pulse-width modulated signals SPWM*a* and SPWM*b* of every other dot, respectively. The NAND circuit 10 can produce the pulse-width modulated signal SPWM in units of dot clock. The embodiment of FIG. 3, therefore, provides an operation and advantages similar to those of the first embodiment shown in FIG. 1.

In the description above, the lower halves of the pattern signals Spa and Spb were just put in the full scale of 00H to FFH of the digital-to-analog converter 9, and the lower halves were compared with the video signal Sv. Alternatively, upper halves of the pattern signals Spa and Spb can be just put in the full scale of 00H to FFH of the digital-to-analog converter 9, and the upper halves can be compared with the video signal Sv. In this case, as the output relationship of the comparators 7A and 7B is reversed, an AND circuit is provided in place of the NAND circuit 10.

Figure 4D:
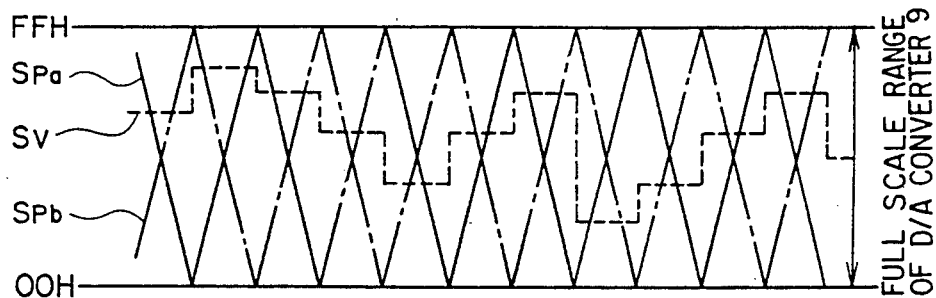
FIG. 4 is a timing chart illustrating the second embodiment.

As another alternative, right or left halves of the pattern signals Spa and Spb can be used. For example, as shown in FIG. 4D, the entire parts of the pattern signals Spa and Spb can be just put in the full scale of 00H to FFH of the digital-to-analog converter 9. In this case, the signals output from the comparators 7A and 7B are shown in FIGS. 7E and 7F, respectively.

If the right halves of the pattern signals Spa and Spb are used, parts of of the signals SPWM*a* and SPWM*b* output from the comparators 7A and 7B corresponding to the right halves of the pattern signals Spa and Spb are selected to form a pulse-width modulated signal SPWM in units of dot clock as shown in FIG. 4G.

On the other hand, if the left halves of the pattern signals Spa and Spb are used, parts of of the signals SPWM*a* and SPWM*b* output from the comparators 7A and 7B corresponding to the left halves of the pattern signals Spa and Spb are selected to form a pulse-width modulated signal SPWM in units of dot clock as shown in FIG. 4H.

Figure 2D:
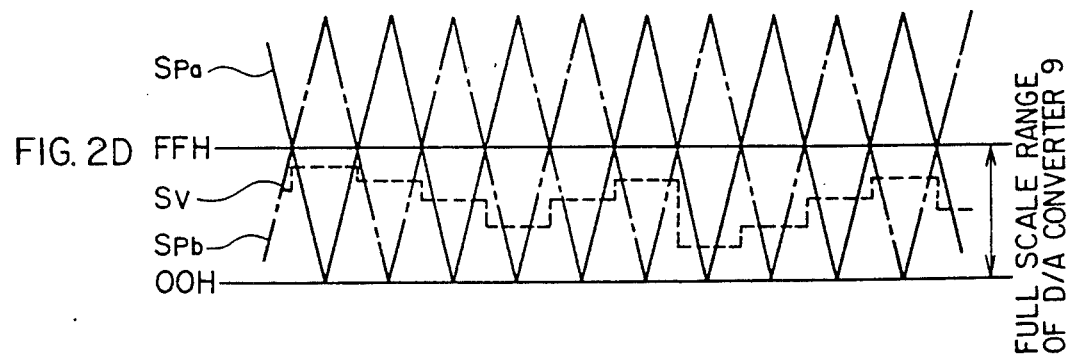
FIG. 2 is a timing chart illustrating the first embodiment.

It should be noted that a phase of the video signal Sv used in FIG. 4D is shifted 180 degrees with respect to the video signal Sv in FIG. 2D. That is, it is shifted to correspond to the parts used of the pattern signals Spa and Spb.

FIGS. 4A through 4C show signals similar to those of FIGS. 2A through 2C.

Figure 5:
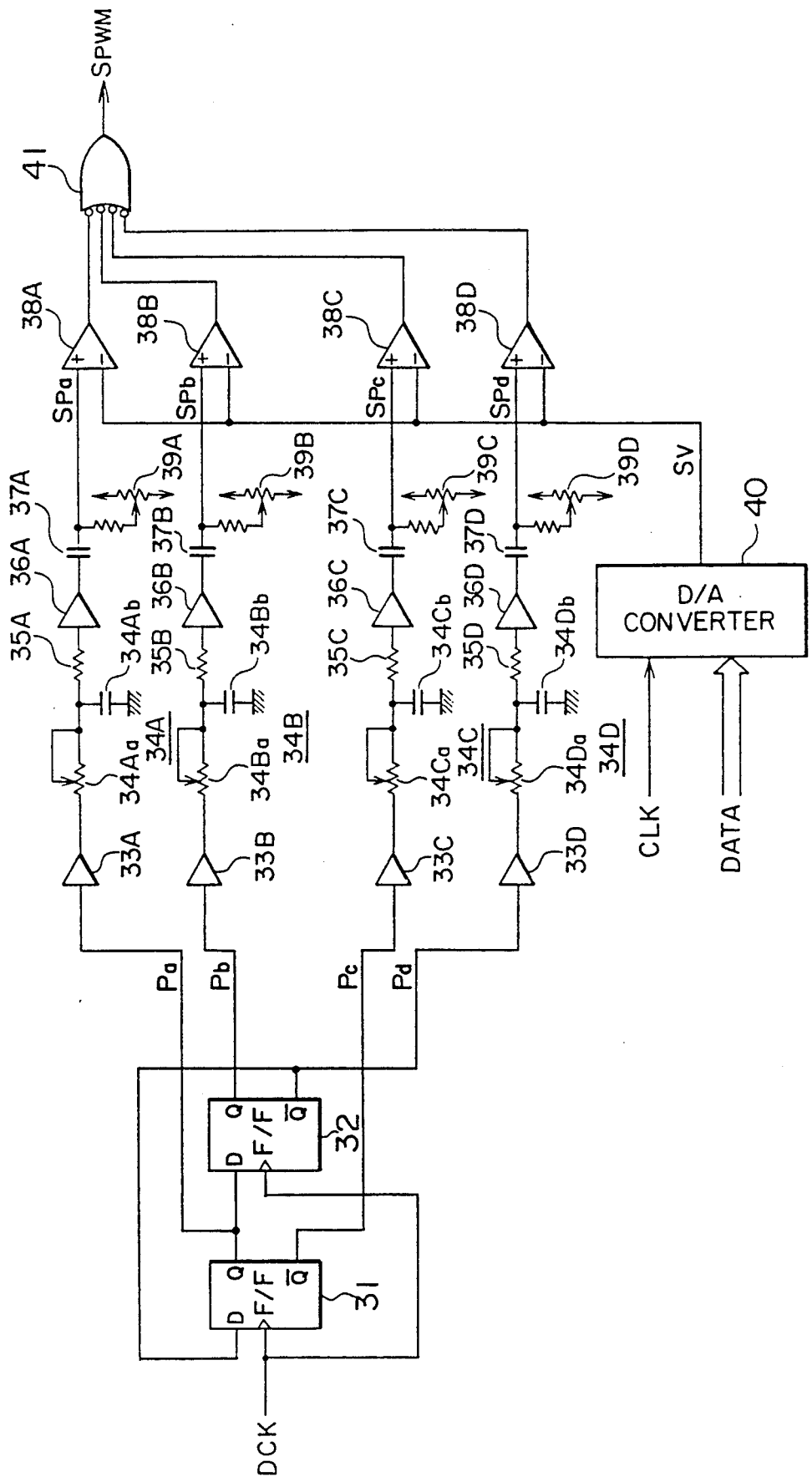
FIG. 5 is a schematic representation of a third illustrative embodiment of the present invention.

FIG. 5 shows a schematic diagram of another embodiment of the present invention. In this embodiment, pattern signals of a period four times longer than those of a dot clock DCK are used.

In FIG. 5, a dot clock DCK synchronized with a video data DATA is fed to a clock pin of D flip-flops 31 and 32 comprising a frequency divider of ¼ frequency division. A signal output of a noninverted output pin Q of the D flip-flop 31 is fed to a pin D of the D flip-flop 32. A signal output of an inverted output pin $\overline{Q}$ of the D flip-flop 32 is fed to a pin D of the D flip-flop 31.

Also, a pulse signal Pa output of the noninverted output pin Q of the D flip-flop 31 is fed through a buffer 33A to an integrator 34A, comprising a variable resistor 34A*a* and a capacitor 34A*b*. A signal output of the integrator 34A is fed through a serial circuit, comprising a resistor 35A, a buffer 5A, and direct-current blocking capacitor 37A, to a comparator 38A as a pattern signal Spa.

The pattern signal Spa can be adjusted in amplitude thereof by the variable resistor 34A*a* so that a lower one fourth of the pattern signal Spa can be just put in a full scale of 00H to FFH of a digital-to-analog converter 40 which will be described later. It also can be adjusted in an offset value of direct current thereof by a variable resistor 39A.

On the other hand, the pulse signal Pb, a phase of which is different by 90 degrees from the pulse signal Pa, output of the noninverted output pin Q of the D flip-flop 32, is fed through a buffer 33B to an integrator 34B, comprising a variable resistor 34Ba and a capacitor 34Bb. A signal output of the integrator 34B is fed through a series circuit, comprising a resistor 35B, a buffer 5B, and direct-current blocking capacitor 37B to a comparator 38B as a pattern signal Spb.

The pattern signal Spb can be adjusted in amplitude thereof by the variable resistor 34Ba so that a lower one fourth of the pattern signal Spb can be just put in a full scale of 00H to FFH of the digital-to-analog converter 40 which will be described later. It also can be adjusted in an offset value of direct current thereof by a variable resistor 39B.

Also, the signal Pc, a phase of which is different by 180 degrees from that from the pulse signal Pc, output of the inverted output pin $\overline{Q}$ of the D flip-flop 31, is fed through a buffer 33C to an integrator 34C, comprising a variable resistor 34Ca and a capacitor 34Cb. A signal output of the integrator 34C is fed through a serial circuit, comprising a resistor 35C, a buffer 5C, and direct-current blocking capacitor 37C, to a comparator 38C as a pattern signal Spc.

The pattern signal Spc can be adjusted in amplitude thereof by the variable resistor 34Ca so that a lower one fourth of the pattern signal Spc can be just put in a full scale of 00H to FFH of a digital-to-analog converter 40 which will be described later. It also can be adjusted in an offset value of direct current thereof by a variable resistor 39C.

On the other hand, the pulse signal Pd, a phase of which is different by 270 degrees from the pulse signal Pa, output of the noninverted output pin $\overline{Q}$ of the D flip-flop 32, is fed through a buffer 33D to an integrator 34D, comprising a variable resistor 34Da and a capacitor 34Db. A signal output of the integrator 34D is fed through a series circuit, comprising a resistor 35D, a buffer 36D, and direct-current blocking capacitor 37D to a comparator 38D as a pattern signal Spd.

The pattern signal Spd can be adjusted in amplitude thereof by the variable resistor 34Da so that a lower one fourth of the pattern signal Spd can be just put in a full scale of 00H to FFH of the digital-to-analog converter 40 which will be described later. It also can be adjusted in an offset value of direct current thereof by a variable resistor 39D.

Also, an a video data DATA of 8 bits, for example, is fed to the digital-to-analog converter 40, in which it is converted to an analog signal. The analog signal is fed to comparators 38A through 38D as a video signal Sv. A symbol CLK in the figure is a clock for digital-to-analog conversion.

The comparators 38A through 38D can compare the respective pattern signals Spa through Spd from the respective integrators 34A through 34D with the video signal Sv from the digital-to-analog converter 40. The signals output of the comparators 38A through 38D are fed to a NAND circuit 41.

Figure 6:
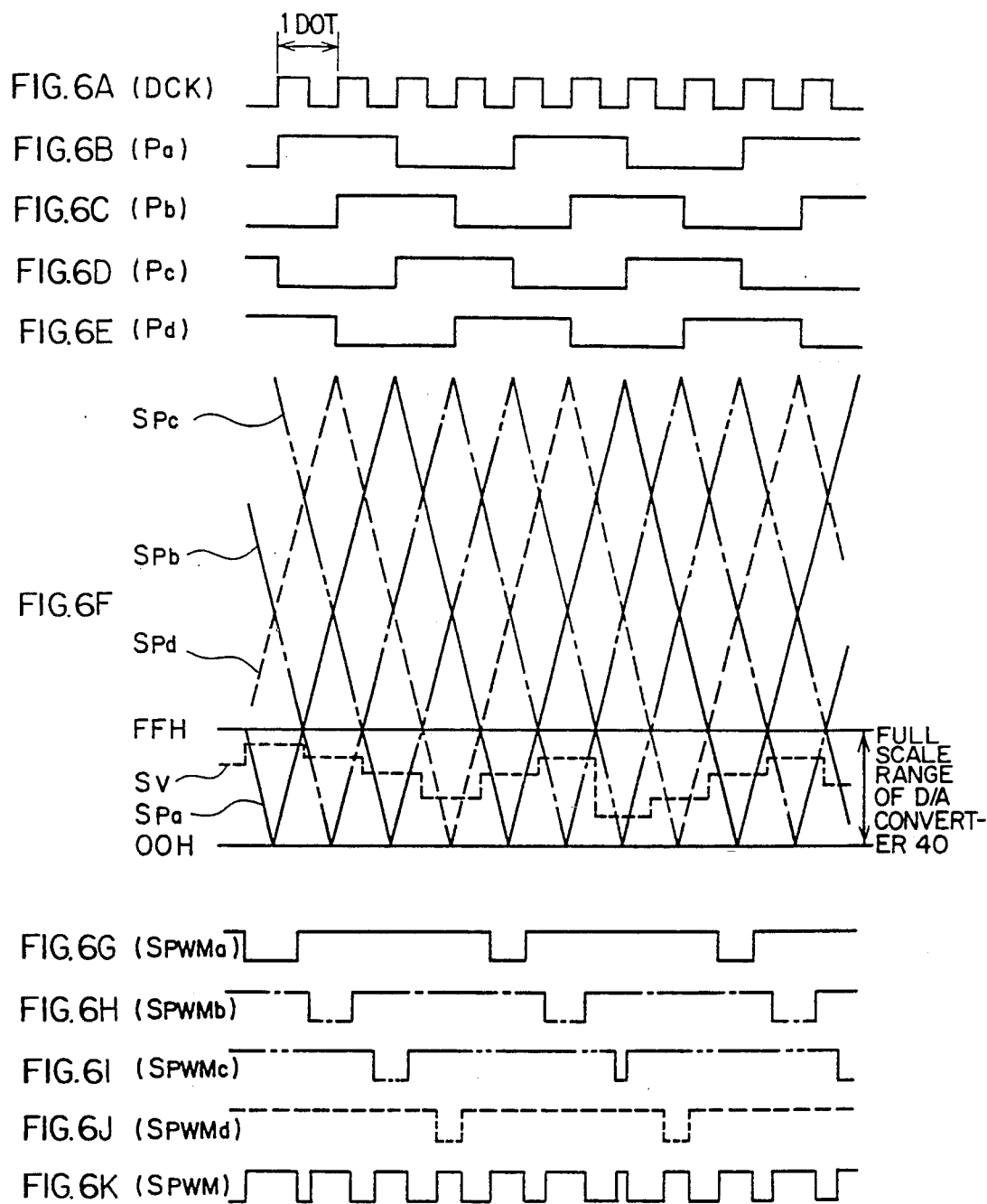
FIG. 6 is a timing chart illustrating the third embodiment.

In the above-mentioned circuit configuration, if the dot clock DCK has a waveform shown in FIG. 6A, the D flip-flops 31 and 32 can output waveforms Pa through Pd shown in FIGS. 6B through 6D. To the comparators 38A through 38D are fed the respective rectangle pattern signals Spa through Spd represented by a solid line, a dot-dash-line, a dot-dot-dash line, and a broken line in FIG. 6F, respectively.

Therefore, if the video signal Sv has a waveform as shown in FIG. 6F, the comparators 38A through 38D can output pulse-width modulated signals SPWMa through SPWMd of every fourth dot shown in FIGS. 6G through 6J, respectively. Therefore, the NAND circuit 41 can output a pulse-width modulated signal SPWM in units of dot on the basis of the video data DATA as shown in FIG. 6K.

In this embodiment, also, the dot clock DCK is frequency-divided, and the pulse-width modulated signal SPWM is output in units of dot clock.

The embodiment described above provides an operation and advantages similar to those of FIG. 1.

Figure 7:
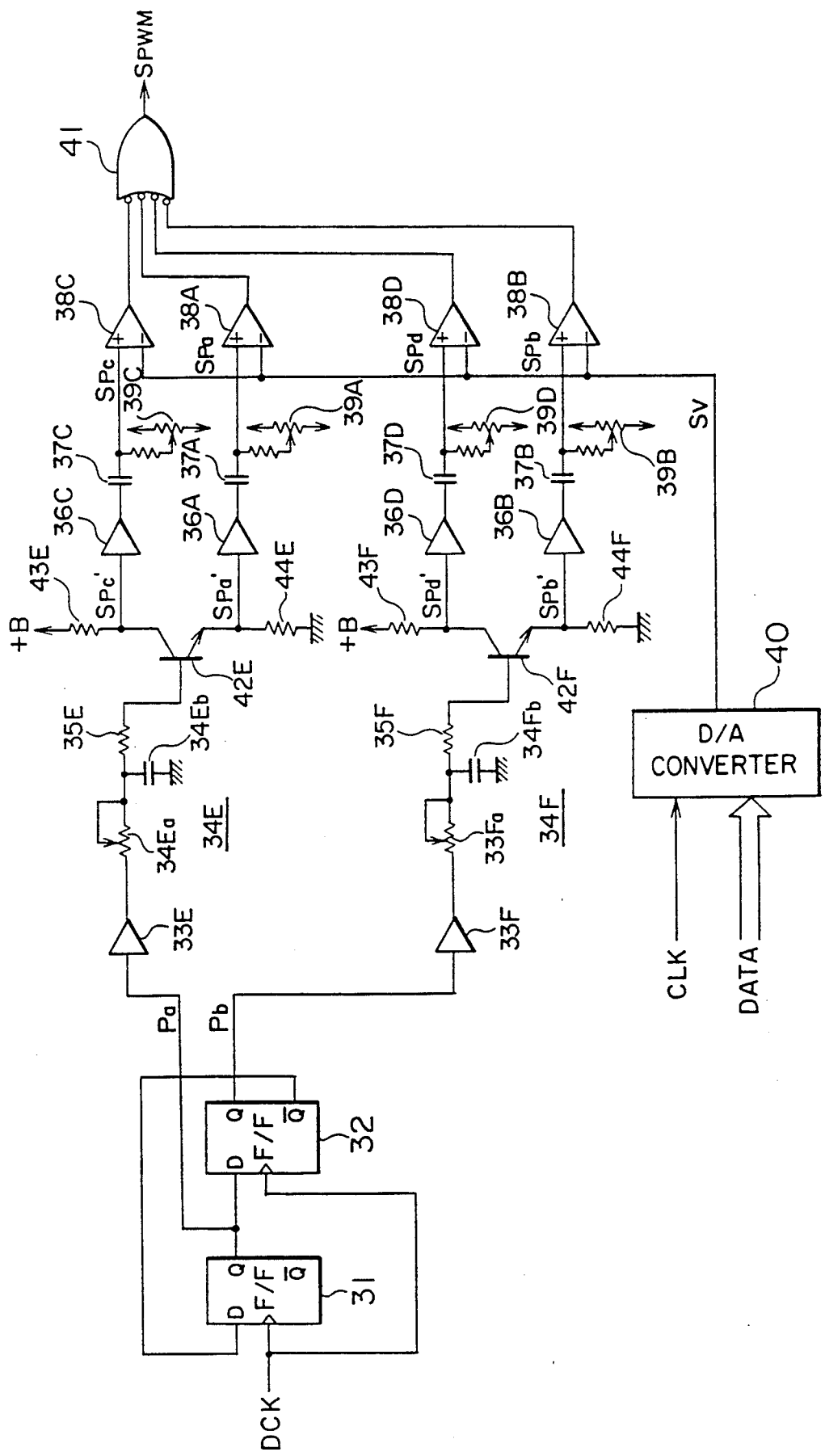
FIG. 7 is a schematic representation of a fourth illustrative embodiment of the present invention.
Figure 9:
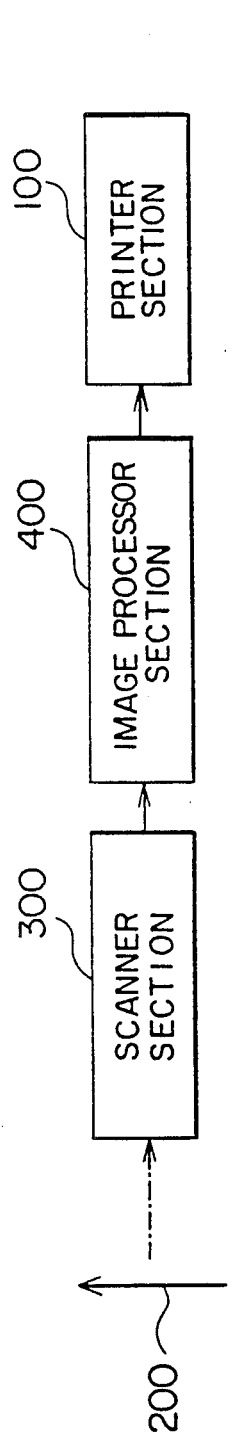
FIGS. 9 through 11 are illustrative representation of a first illustrative embodiment of an image processing apparatus.
Figure 10:
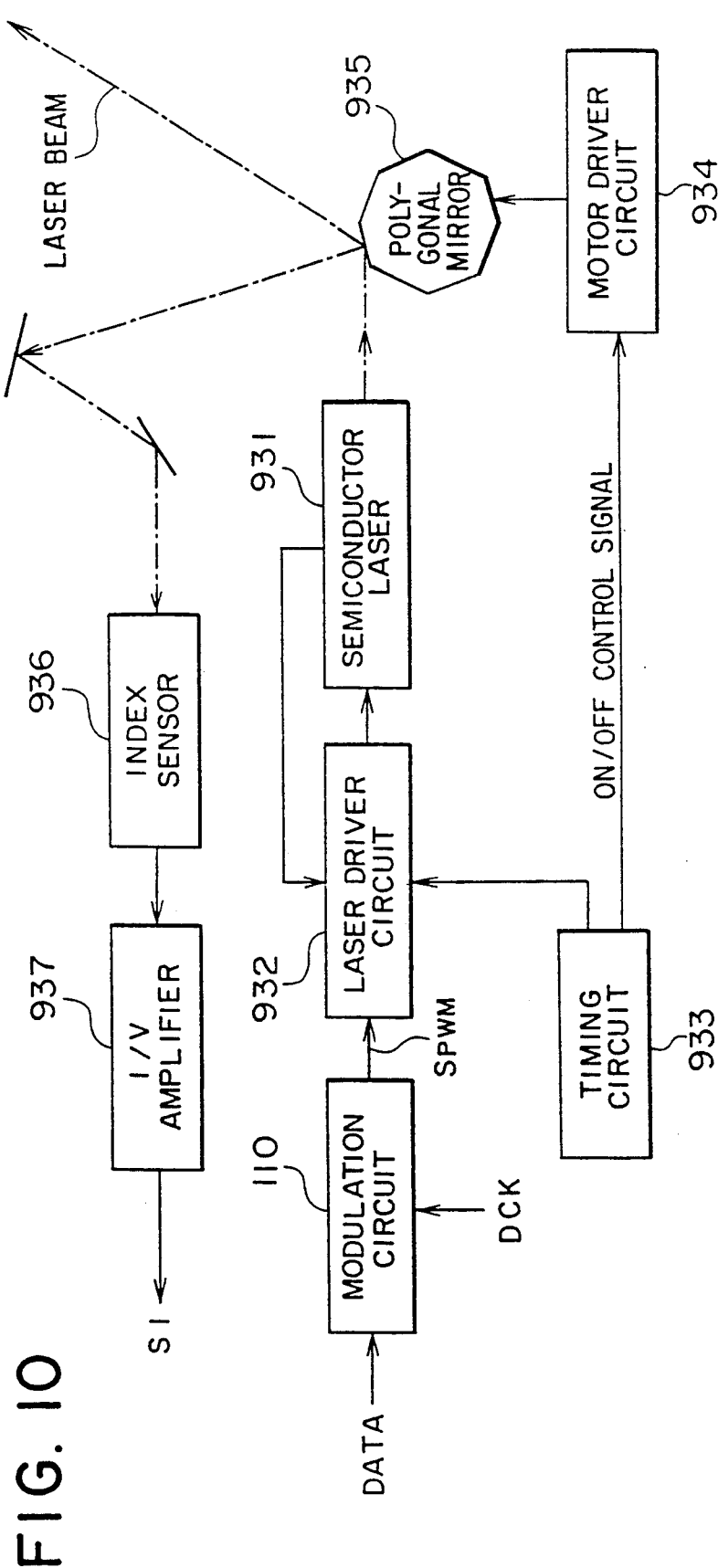
Figure 11:
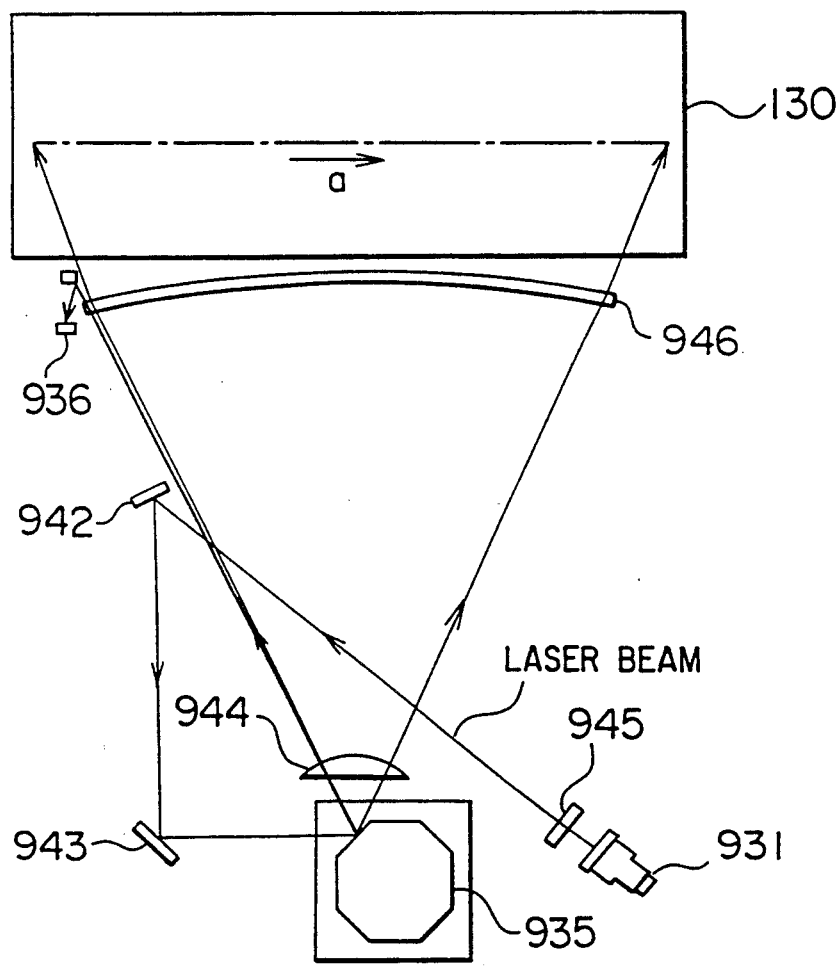
Figure 14A:
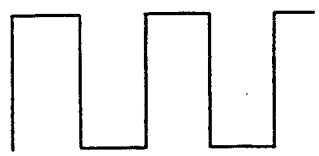
Figure 15A:
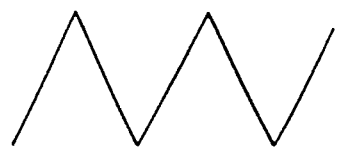
Figure 14B:
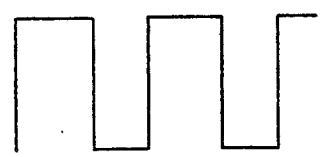
Figure 15B:
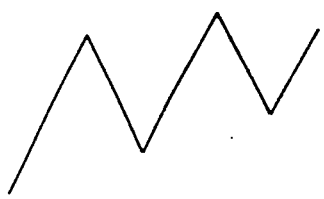
Figure 14C:
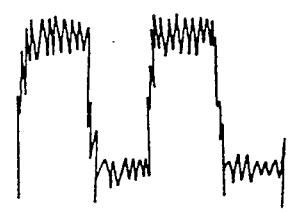
Figure 15C:
Figure 14D:
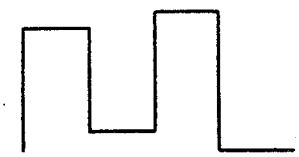
Figure 15D:
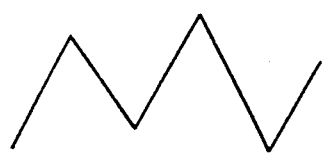

FIG. 7 shows a schematic diagram of another embodiment of the present invention. Component parts in FIG. 7 which are the same as those in FIG. 5 have the same reference symbols and their detailed description is omitted.

In FIG. 7, a pulse signal Pa output of a noninverted output pin Q of a D flip-flop 31 has a period four times longer than that of a dot clock DCK. It is fed through a buffer 33E to an integrator 34E, comprising a variable resistor 34Ea and a capacitor 34Eb. A signal output of the integrator 34E is fed through a resistor 35E to a base of an NPN transistor 42E. A collector of the transistor 42E is connected through a resistor 43E to a power supply terminal +B. An emitter of the transistor 42E is grounded through a resistor 44E.

The transistor 42E can produce at the emitter and collector rectangle pattern signals Spa' and Spc' of inverse phase to each other, respectively, which have a period four times longer than that of the dot clock DCK.

The pattern signal Spa' output of the emitter of the transistor 42E is fed through a serial circuit, comprising a buffer 36A and a direct current blocking capacitor 37A, to a comparator 38A as a pattern signal Spa. The pattern signal Spc' output of the emitter of the transistor 42E, on the other hand, is fed through a serial circuit, comprising a buffer 36C and a direct current blocking capacitor 37C, to a comparator 38C as a pattern signal Spc.

The pattern signals Spa and Spc can be adjusted in amplitudes thereof by the variable resistor 34Ea so that lower one fourth of the pattern signals Spa and Spc can be just put in a full scale of 00H to FFH of a digital-to-analog converter 40. They also can be adjusted in offset values of direct current thereof by variable resistor 39A and 39C.

Also, a pulse signal Pb output of a noninverted output pin Q of a D flip-flop 32 has a period four times longer than that of a dot clock DCK. It is fed through a buffer 33F to an integrator 34F, comprising a variable resistor 34Fa and a capacitor 34Fb. A signal output of the integrator 34F is fed through a resistor 35F to a base of an NPN transistor 42F. A collector of the transistor 42F is connected through a resistor 43F to a power supply terminal +B. An emitter of the transistor 42F is grounded through a resistor 44F.

The transistor 42F can produce at the emitter and collector rectangle pattern signals Spb' and Spd' of inverse phase to each other, respectively, which have a period four times longer than that of the dot clock DCK.

The pattern signal Spb' output of the emitter of the transistor 42F is fed through a serial circuit, comprising a buffer 36B and a direct current blocking capacitor 37B, to a comparator 38B as a pattern signal Spb. The pattern signal Spd' output of the emitter of the transistor 42F, on the other hand, is fed through a serial circuit, comprising a buffer 36D and a direct current blocking capacitor 37D, to a comparator 38D as a pattern signal Spd.

The pattern signals Spb and Spd can be adjusted in amplitudes thereof by the variable resistor 34Fa so that lower one fourth of the pattern signals Spb and Spd can be just put in a full scale of 00H to FFH of a digital-to-analog converter 40. They also can be adjusted in offset values of direct current thereof by variable resistor 39B and 39D.

In the circuit configuration described above, also, the pulse signals Pa and Pb are formed by that the dot clock DCK is frequency-divided by the D flip-flops 31 and 32. The pattern signals Spa through Spd formed on the basis of the pulse signals Pa and Pb are fed to the comparators 38A through 38D. The NAND circuit 41 can produce the pulse-width modulated signal SPWM in units of dot clock. The embodiment, therefore, provides an operation and advantages similar to those of the embodiment shown in FIG. 5.

In the description above, the lower one fourth of the pattern signals Spa through Spd were just put in the full scale of 00H to FFH of the digital-to-analog converter 40, and the lower one fourth were compared with the video signal Sv. Alternatively, upper one fourth of the pattern signals Spa through Spd can be just put in the full scale of 00H to FFH of the digital-to-analog converter 40, and the upper one fourth of the pattern signals Spa through Spd can be compared with the video signal Sv in the comparators 38A through 38D, respectively. In this case, as the output relationship of the comparators 38A through 38D is reversed, an AND circuit is provided in place of the NAND circuit 41.

Alternatively, right or left continuous halves of the pattern signals Spa through Spd can be used. For example, as shown in FIG. 8F, the pattern signals Spa through Spd can be just put in the full scale of 00H to FFH of the digital-to-analog converter 40. The resultant signals output of the comparators 38A through 38D are shown in FIGS. 8G and 8J, respectively.

If the lower right halves of the pattern signals spa through Spd are used, parts of of the signals SPWMa through SPWMd output of the comparators 38A through 38D corresponding to the lower right halves of the pattern signals Spa through Spd are selected to form a pulse-width modulated signal SPWM in units of dot clock as shown in FIG. 8K.

On the other hand, if the lower left halves of the pattern signals Spa through Spd are used, parts of of the signals SPWMa through SPWMd output of the comparators 38A through 38D corresponding to the lower left halves of the pattern signals Spa through Spd are selected to form a pulse-width modulated signal SPWM in units of dot clock as shown in FIG. 8L.

It should be noted that a phase of the video signal Sv used in FIG. 8F is shifted 180 degrees with respect to the video signal Sv in FIG. 6F. That is, it is shifted to correspond to the parts used of the pattern signals Spa through Spd.

FIGS. 8A through 8E show signals similar to those of FIGS. 6A through 6A.

In the embodiments described above, the one half and halves and one fourth and fourths of the pattern signals have been used as examples. However, it can be clearly seen that a part or parts, or $\frac{1}{2}N$ where N is a positive integer, of the pattern signals can be used to form the pulse-width modulated signal in a similar way.

In the embodiments above, the pattern signals used have been triangular waves as an example. However, they may be replaced by a sawtooth wave or the like.

As explained above, in the image processing apparatus according to the present invention, the dot clock is frequency-divided to eliminate a possible duty cycle change thereof and the like contained in the dot clock. This means that the pattern signals will not have any distortion caused therein to prevent a possible adverse change of linearity for modulation from deteriorating an image reproduced. Also, as the apparatus can obtain the pulse-width modulated signal in units of dot clock, the reproduced image cannot be deteriorated in the resolution thereof.

What is claimed is:

1. An image processing apparatus for processing an image signal, comprising:
   clock means for generating a periodical clock signal;
   pattern signal generating means for generating 2N pattern signals, where N is a positive integer, each of said 2N pattern signals having a constant waveform and a wave length 2N times longer than that of said periodical clock signal, and wherein each of said pattern signals has a phase difference of 360/2N degrees relative to another one of said 2N pattern signals;
   comparator means for comparing said 2N pattern signals with said image signal, and for generating 2N comparison signals; and
   composition means for combining said 2N comparison signals and for generating a pulse-duration modulated signal from said combined 2N comparison signals.

2. An image processing apparatus according to claim 1, wherein each of said 2N comparison signals corresponds to a comparison of said image signal with a respective one of said 2N pattern signals.

3. An image processing apparatus according to claim 1, wherein said composition means comprises a gating circuit.

4. An image processing apparatus according to claim 3, wherein said gating circuit comprises a NAND circuit.

5. An image processing apparatus according to claim 1, wherein:
   the value of N is one;
   said pattern signal generating means generates two pattern signals having a wavelength two times longer than that of said periodical clock signal, wherein said two pattern signals are 180 degrees out of phase relative to one another;
   said comparator means compares each of said two pattern signals with said image signal and generates two comparison signals; and
   said composition means combines said two comparison signals and generates a pulse-duration modulated signal from said two combined comparison signals.

6. An image processing apparatus according to claim 5, wherein said composition means comprises a gating circuit.

7. An image processing apparatus according to claim 6, wherein said gating circuit comprises a NAND circuit.

8. An image processing apparatus according to claim 1, wherein:

the value of N is two;

said pattern signal generating means generates four pattern signals having a wavelength four times longer than that of said periodical clock signal, wherein said four pattern signals are 90 degrees out of phase relative to one another;

said comparator means compares each of said four pattern signals with said image signal and generates four comparison signals; and said composition means combines said four comparison signals and generates a pulse-duration modulated signal from said four combined comparison signals.

9. An image processing apparatus according to claim 8, wherein said composition means comprises a gating circuit.

10. An image processing apparatus according to claim 9, wherein said gating circuit comprises a NAND circuit.

11. An image processing apparatus for processing an image signal, comprising:

clock means for generating a periodical clock signal;

pattern signal generating means for generating 2N pattern signals, where N is a positive integer, each of said 2N pattern signals having a constant waveform and a wave length 2N times longer than that of said periodical clock signal, and wherein each of said pattern signals has a phase difference of 360/2N degrees relative to another one of said 2N pattern signals;

comparator means for comparing respective portions of said 2N pattern signals with said image signal, and for generating respective comparison signals; and composition means for combining said 2N comparison signals and for generating a pulse-duration modulated signal from said combined 2N comparison signals.

12. An image processing apparatus according to claim 11, wherein said N portions comprise upper and lower portions of said 2N pattern signals.

13. An image processing apparatus according to claim 11, composition means comprises a gating circuit.

14. An image processing apparatus according to claim 13, wherein said gating circuit comprises a NAND circuit.

15. An image processing apparatus according to claim 13, wherein said gating circuit comprises an AND circuit.

* * * * *